United States Patent [19]

Takayasu

[11] Patent Number: 4,568,484
[45] Date of Patent: Feb. 4, 1986

[54] INSOLUBLE LEAD OR LEAD ALLOY ELECTRODE

[76] Inventor: Kiyosumi Takayasu, 5-1, Horita-Dori, Mizuho-Ku, Nagoya City, Aichi Pref, Japan

[21] Appl. No.: 612,652

[22] Filed: May 21, 1984

[30] Foreign Application Priority Data

Jun. 13, 1983 [JP] Japan ................ 58-89020[U]

[51] Int. Cl.$^4$ .............................................. H01B 1/02
[52] U.S. Cl. .................................... 252/512; 252/506; 252/513; 429/218; 429/220; 429/221
[58] Field of Search ................ 252/512, 513; 429/218, 429/220, 221

[56] References Cited

U.S. PATENT DOCUMENTS 4,346,022  8/1982  Wolcott et al. ..................... 252/512
4,478,693 10/1984  Ray ..................................... 252/513

Primary Examiner—A. Lionel Clingman
Attorney, Agent, or Firm—Parkhurst & Oliff

[57] ABSTRACT

Disclosed herein is an insoluble lead or lead alloy electrode adapted for electroplating and having a power supply hanger of a high electroconductive material. The electrode plate includes a clad member as a base metal, which is coated with a film of a high corrosion resistance metal at whole surface thereof, and a build-up layer of lead or the lead alloy on one surface of the clad member.

1 Claim, 4 Drawing Figures

FIG_2b
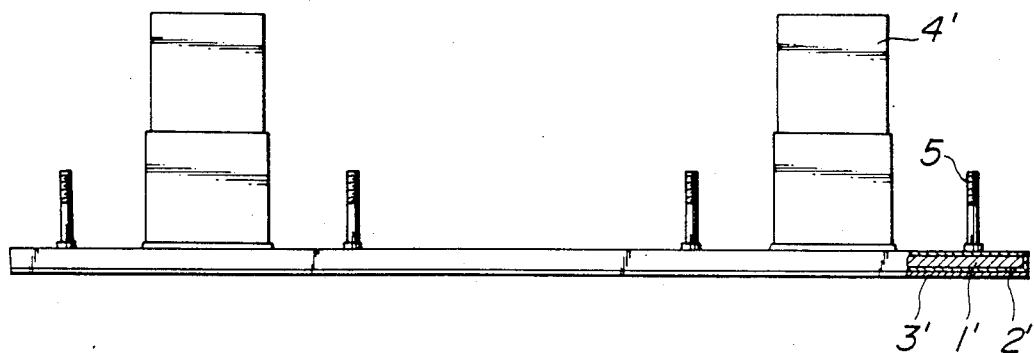
FIG_2c
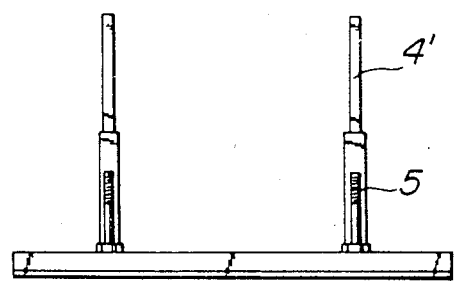

INSOLUBLE LEAD OR LEAD ALLOY ELECTRODE

BACKGROUND OF THE INVENTION (1) Field of the Invention

The present invention relates to insoluble lead or lead alloy electrode, and more particularly the invention is to provide insoluble lead or lead alloy electrode for electroplating, which is excellent in energy efficiency and easy to regenerate through repair.

(2) Description of the Prior Art

At present, there have widely been used the electrodes made of lead or a lead alloy such as Pb-Sn, Pb-Sb or the like as an insoluble electrode for use in electroplating with zinc, chromium or the like. In the electrodes of this type, although only substantially one side of the electrode is required as discharging face, from the standpoint of corrosion resistance, there has been used an electrode which is entirely made of lead or the lead alloy, or the one wherein the whole side surfaces of a core member of the electrode plate are subjected to a lead homogenizing treatment.

However, in the above electrode, since it is structurally impossible to prevent the occurrence of the wasteful electric discharge from the backside of the electrode, the current efficiency is disadvantageously poor. Further, since the dissolving amount of lead is larger, there is also disadvantage that an area of the lead pollution becomes wider. In addition, in case the wear-out electrode is regenerated through repair, it is necessary to make a lead build-up upon the whole surface of the electrode, so that there are various kinds of problems, for example, that it takes not a short time to repair the electrode plate and at the same time it becomes costly to repair.

As the countermeasures for preventing the occurrence of the wasteful electric discharge, that is, the stay current, from the backside of the electrode, it has been proposed that an electric insulating lining of, for instance, resin, rubber or the like, is formed on the backside surface of the electrode plate. But, such a proposal is not free from the defects that a superfluous step in the repair-regeneration is required with an increased manufacturing cost.

SUMMARY OF THE INVENTION

It is, therefore, an object of the invention to advantageously solve the above various problems of the conventional lead or lead alloy electrodes, and to provide herein an insoluble electrode which fully meets requirements for corrosion resistance and effectively prevents the occurrence of the stay current in electrolyzing so as to diminish a wasteful loss in the electric power, while being easy to regenerate through repair.

According to the invention, the above problems are eliminated by the construction that a build-up of lead or a lead alloy (both being hereinafter referred to as "lead alloy") is formed upon only one side surface of a clad member as a base metal in which the whole surface of the core member is clad with a metal film of a high corrosion resistance, in the electrode plate as an electrolyzing electrode.

BRIEF DESCRIPTION OF THE DRAWINGS

The invention will be described more in detail with reference to the attached drawings, wherein:

FIGS. 2a, 2b and 2c are a plan view, a front view and a side view of another preferred embodiment according to the invention, respectively.

DETAILED DESCRIPTION OF THE PREFERRED EMBODIMENTS

Figure 1:
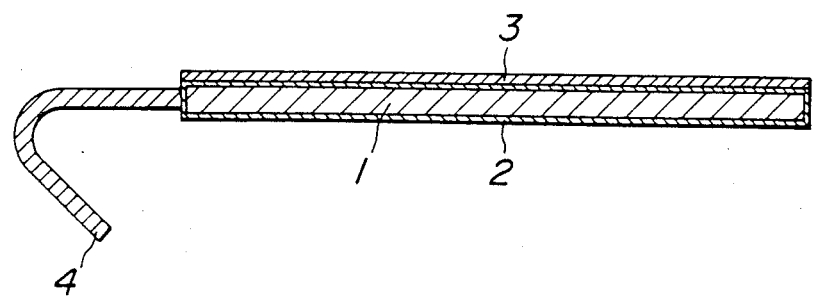
FIG. 1 is a sectional view of an insoluble lead alloy electrode as a preferred embodiment according to the invention.

In FIG. 1 sectionally showing a lead alloy electrode as one preferred embodiment according to the invention, a numeral 1 is a core member of an electrode plate, which may be made of iron, copper or the like. The whole surface of the core member 1 is clad with a film 2 of titanium tantalum, or niobium to form a base metal of the electrode plate. A discharging face is formed by cladding a build-up layer 3 of the lead alloy on only one side surface of the base metal. A numeral 4 is a power supply hanger made of iron or copper. As a method of building up the lead alloy upon the clad titanium, there may be advantageously adapted a TIG build-up welding under an argon gas sealing.

According to the electrode thus constituted, the use amount of the lead alloy is reduced to a large degree, since the build-up of the lead alloy is formed only on one side surface of the electrode. Further, as the titanium is rendered passive in a plating solution, there is no likelihood that a wasteful discharge occurs from the backside surface or the other side surface other than the discharging face of the electrode plate at the time of electrolysis. Moreover, when the worn electrode is required to be regenerated through repair, build-up may be formed only on one side surface, so that the build-up step is simplified and shortened.

Turning now to FIGS. 2a to 2d, there is shown another preferred embodiment according to the invention in plane, in elevation and in side plane, respectively.

Figure 2A:
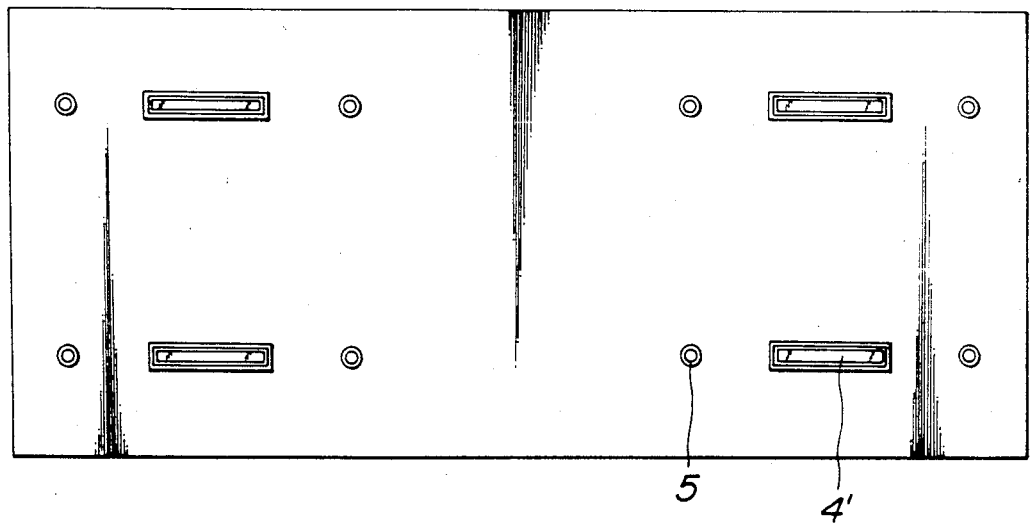

In FIGS. 2a to 2c, the embodiment is applied to a large scale electrode, wherein a reference numeral 1' is a core member of the electrode plane, a reference numeral 2' is a clad of a titanium film, and a reference numeral 3' is a build-up layer of the lead alloy. The main constituent features of the electrode plane are the same of those shown in FIG. 1. That is, a reference numeral 4' is a power supply hanger, and in this embodiment, four power supply hangers are disposed at the back side of the electrode plate. The electric current is supplied to the electrode plate through these power supply hangers, and at the same time, the electrode plates are supported at a specified location thereby. A reference numeral 5 is a support reinforcement for the electrode plate.

The effects conferred by the invention will be summarized as follows:

(1) Since the entire core member of the electrode plate is clad with a metal film of a high corrosion resistance, even if the lead alloy is worn out, the core member made of iron or copper will not be exposed to the outside unlike in the case of the conventional case. Thereby, an excellent corrosion resistance can be assured.

(2) Since the whole surface of the electrode plate other than the discharging face is rendered passive in the plating liquid, no wasteful discharge occurs from the backside surface and the side surfaces of the electrode plate. Thereby, the electric current efficiency can be enhanced. Further, since the stay current is eliminated, operation becomes possible at a low electric voltage lowered by a voltage difference corresponding to the eliminated stay current, and excellent plating operation is realized at a low cost.

(3) Since the use amount of the lead alloy can be halved, the invention is advantageous in energy saving and the electrode plate becomes light in weight, thereby rendering the handling easier.

(4) In repair-regeneration after the electrode wears, there is no need to treat the backside, for instance, treating the backside with an insulating resin or rubber lining as in the case with the prior art, but it is sufficient merely to build-up only one side of the electrode plate. Therefore, the repair is easy and economical.

What is claimed is:

1. An insoluble lead or lead alloy electrode adapted for electroplating and having a power supply hanger connected thereto, said electrode comprising a core member, a film coated on the entire surface of the core member to form a clad member as a base metal, and a build-up layer made of lead or a lead alloy formed on one surface of the clad member, said power supply hanger and said core member comprise a high electro-conductive material selected from the group consisting of iron and copper, and said film comprises a high corrosion resistant metal selected from the group consisting of titanium, tantalum and niobium.

* * * * *